United States Patent
Chou et al.

(10) Patent No.: US 11,212,573 B2
(45) Date of Patent: Dec. 28, 2021

(54) SYSTEMS, METHODS, AND DEVICES FOR MANAGING SEGMENTED MEDIA CONTENT

(71) Applicant: Synamedia Limited, Staines Upon Thames (GB)

(72) Inventors: Hoi-Tauw Chou, Dublin, CA (US); Ryan Michael Okelberry, Provo, UT (US); Clint Earl Ricker, Lawrenceville, GA (US); Ivan V. Legrand, Aurora, CO (US)

(73) Assignee: Synamedia Limited, Staines Upon (GB)

( * ) Notice: Subject to any disclaimer, the term of this patent is extended or adjusted under 35 U.S.C. 154(b) by 0 days.

(21) Appl. No.: 16/786,084

(22) Filed: Feb. 10, 2020

(65) Prior Publication Data
US 2021/0250635 A1    Aug. 12, 2021

(51) Int. Cl.
| | |
|---|---|
| *H04N 21/4335* | (2011.01) |
| *H04N 21/4147* | (2011.01) |
| *G06F 16/783* | (2019.01) |
| *H04N 21/218* | (2011.01) |
| *H04N 21/433* | (2011.01) |

(52) U.S. Cl.
CPC ....... *H04N 21/4147* (2013.01); *G06F 16/783* (2019.01); *H04N 21/2181* (2013.01); *H04N 21/4334* (2013.01); *H04N 21/4335* (2013.01)

(58) Field of Classification Search
None
See application file for complete search history.

(56) References Cited

U.S. PATENT DOCUMENTS

| | | | |
|---|---|---|---|
| 2015/0113575 A1* | 4/2015 | Li | H04N 21/235 725/92 |
| 2017/0105028 A1* | 4/2017 | Ricker | H04N 21/2181 |
| 2017/0105036 A1* | 4/2017 | Viveganandhan | H04N 21/23109 |
| 2017/0123713 A1 | 5/2017 | Fisher et al. | |
| 2017/0168697 A1* | 6/2017 | Shpalter | H04N 21/6547 |
| 2018/0137208 A1 | 5/2018 | Ricker et al. | |

OTHER PUBLICATIONS

Extended European Search Report dated Apr. 21, 2021, European Application No. 21155016.5, pp. 1-8.

* cited by examiner

*Primary Examiner* — Eileen M Adams
(74) *Attorney, Agent, or Firm* — Fernando & Partners, LLP

(57) ABSTRACT

A method includes receiving a request to initiate recording of a media object. The media object includes a first plurality of sequential media segments. The first plurality of sequential media segments is associated with a corresponding plurality of metadata files, each of which providing a description of a respective one of the first plurality of sequential media segments. The method includes generating, in response to receiving the request to initiate recording of the media object, a first common metadata file that is associated with the media object as a function of the corresponding plurality of metadata files. The first common metadata file includes sequencing information associated with the first plurality of sequential media segments. The method includes storing the first plurality of sequential media segments based on the sequencing information included in the first common metadata file.

20 Claims, 9 Drawing Sheets

US 11,212,573 B2

SYSTEMS, METHODS, AND DEVICES FOR MANAGING SEGMENTED MEDIA CONTENT

TECHNICAL FIELD

The present disclosure relates to storage systems, and, in particular, to enabling more efficient management of media segments.

BACKGROUND

Cloud-enabled/network-based digital video recording (cDVR) facilitates media content recording and delivery (e.g., playback). A cDVR system often stores media content as a media object that corresponds to a complete recording, such as an entire episode of a television show. Typically, a media object includes a number of discrete media segments. In order to manage (e.g., record, playback, and delete) the discrete media segments, a conventional cDVR system associates each discrete media segment with a corresponding metadata file that describes the media segment. However, the conventional cDVR system utilizes a high level of system resources (e.g., memory and processing resources) and power in storing and processing each corresponding metadata file.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
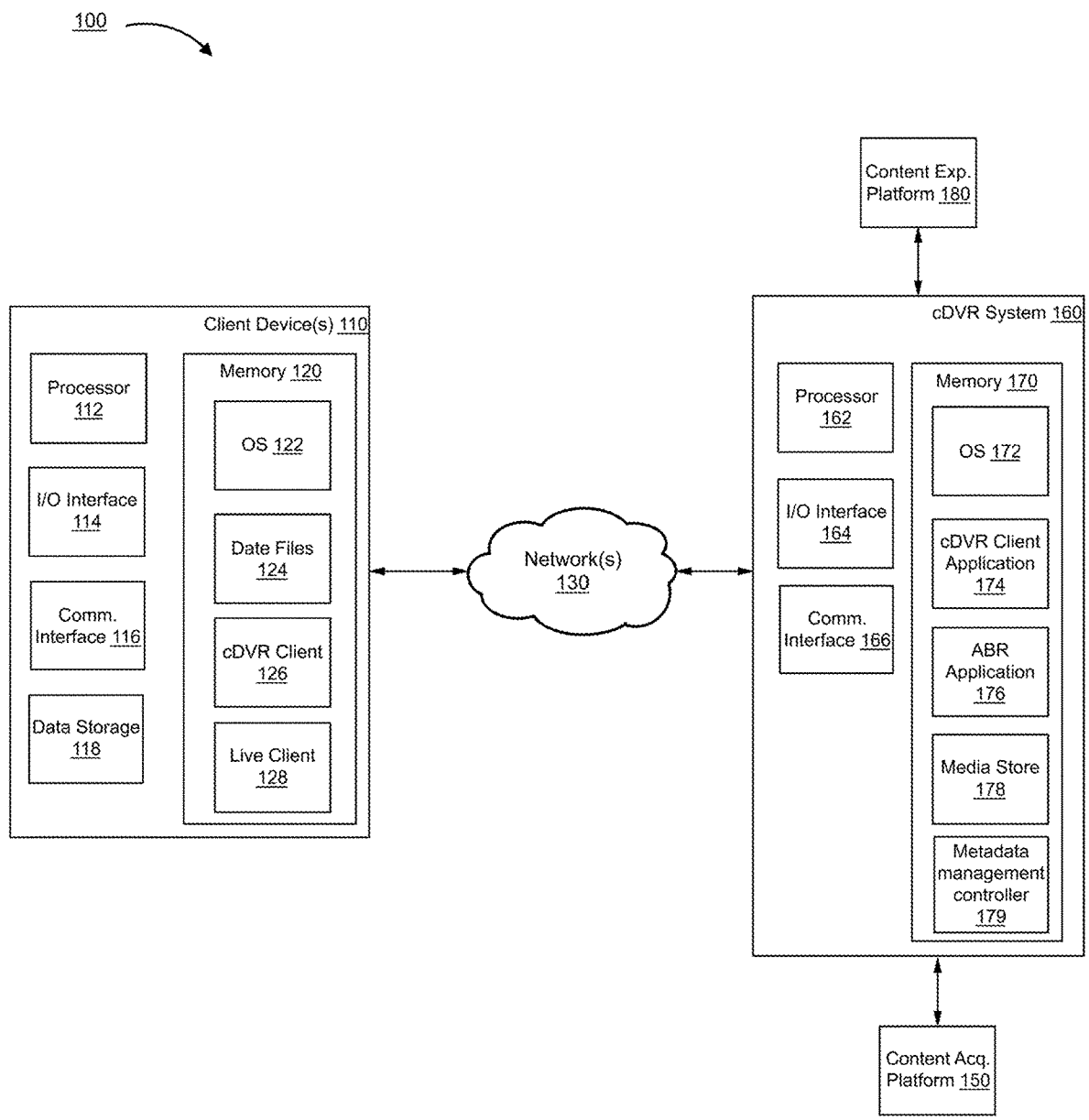
FIG. 1 is a block diagram of a cloud-based digital video recording (cDVR) operating environment.

In accordance with common practice, various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Techniques for managing (e.g., storing, playing back, and deleting) a media object in a more efficient manner are described herein. Namely, various methods, systems (e.g., cDVR systems), and apparatuses include generating and utilizing a single, common metadata file for a media object. The media object includes sequencing information associated with multiple sequential media segments of the media object.

To that end, in accordance with some embodiments, a method is performed at an electronic device with one or more processors and a non-transitory memory, such as at a cDVR recorder (e.g., storage and playback system). The method includes receiving a request to initiate recording of a media object. The media object includes a first plurality of sequential media segments. The first plurality of sequential media segments is associated with a corresponding plurality of metadata files. In some embodiments, a portion of the corresponding plurality of metadata files are respectively associated with a plurality of metadata records. Each of the corresponding plurality of metadata files provides a description of a respective one of the first plurality of sequential media segments. The method includes generating, in response to receiving the request to initiate recording of the media object, a first common metadata file that is associated with the media object as a function of the corresponding plurality of metadata files. The first common metadata file includes sequencing information associated with the first plurality of sequential media segments. The method includes storing the first plurality of sequential media segments based on the sequencing information included in the first common metadata file.

In accordance with some embodiments, an electronic device includes one or more processors and a non-transitory memory. The one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device, cause the device to perform or cause performance of the operations of any of the methods described herein. In accordance with some embodiments, an electronic device includes means for performing or causing performance of the operations of any of the methods described herein. In accordance with some embodiments, an information processing apparatus, for use in an electronic device, includes means for performing or causing performance of the operations of any of the methods described herein.

A cDVR system facilitates recording and playback of media content. In some systems, media content is often stored as a media object that corresponds to a complete recording, such as an entire episode of a television show. Typically, a media object includes a number of discrete media segments. For example, a cDVR system may record every two seconds of a television show. In an adaptive bit rate (ABR) environment, the cDVR system records a plurality of discrete media segments respectively corresponding to a plurality of different representations (e.g., different encoding rates providing resolution of 720p, 1080p, 4K) of the same media content.

A cDVR system typically includes a storage system and a sequencing system for sequencing the discrete media segments based on the corresponding metadata files. In order to manage (e.g., record, playback, and delete) the discrete media segments, the cDVR system associates each discrete media segment with a corresponding metadata file that describes the media segment. For example, a metadata file includes a source identifier, a recording identifier, and a segment identifier. However, because a separate metadata file is associated with each discrete media segment, the storage system often requires a large storage capacity in order to store the relatively high number of metadata files. Moreover, the required storage capacity is even higher for cases in which multiple representations of the same media object are stored. Additionally, the sequencing system utilizes a large amount of computational resources (e.g., processing resources and power) when performing complex sequencing operations with respect to the media segments, based on corresponding metadata files. For example, in order to delete a media object, a system processes a number of separate delete requests corresponding to the number of media segments in the media object. Moreover, the storage and processing challenges resulting from using per-segment metadata files are amplified in unique copy systems, as a distinct set of metadata files is stored for each recording identifier (e.g., each user profile). The high storage demands and high processing demands prevent effective scaling of the system.

FIG. 1 is a block diagram of a cloud-based digital video recording (cDVR) operating environment 100. Briefly, a content acquisition platform (CAP) 150 can communicate with a cDVR system 160, which includes a media store 178 for storing media content, such as a television show. The cDVR system 160 often stores media content as a media object that corresponds to a complete recording, such as an entire episode of a television show. Typically, a media object includes a number of discrete media segments. One or more client devices 110 can communicate over one or more networks 130 with the cDVR system 160.

The CAP 150 includes one or more computing devices that provide content streaming (real-time and/or non-real-time content delivery), the delivery of stored and/or recorded discrete media segments, or the like. Additionally, the CAP 150 acquires and transcodes discrete media segments and optionally protects and encrypts the discrete media segments. The cDVR system 160 may include one or more edge servers, one or more routers and/or bridges, one or more data center servers, one or more content databases, and/or one or more content servers. The various elements of the cDVR system 160 can cooperate to receive discrete media segments from the CAP 150 and appropriately cache the discrete media segments for access by the one or more client devices 110.

The cDVR system 160 stores records associated with user accounts and discrete media segments associated with the user accounts on magnetic recording and reproducing devices, such as the media store 178. The media store 178 includes one or more hard disk drives, which may be controlled by various hard disk controllers.

In order to facilitate management (e.g., recording, playback, and deletion) of discrete media segments, the cDVR system 160 includes a metadata management controller 179. The metadata management controller 179 performs sequencing with respect to a plurality of discrete media segments based on a corresponding plurality of metadata files. Each metadata file describes a corresponding discrete media segment and each metadata file is stored on the cDVR system 160. For example, in order to store five discrete media segments of a media object (e.g., the first 10 seconds of a television show), the metadata management controller 179 performs five sequencing operations on the five discrete media segments. For each of the five sequencing operations, the metadata management controller 179 processes a corresponding metadata file.

The cDVR system 160 includes one or more processors 162, one or more memories 170, one or more input/output (I/O) interfaces 164, and one or more communication interfaces 166. The one or more processors 162 can individually comprise one or more cores and can be configured to access and execute, at least in part, instructions stored in the one or more memories 170. The one or more memories 120 include one or more non-transitory computer readable storage media (CRSM). The one or more memories 170 can include, but are not limited to, random access memory (RAM), flash RAM, magnetic media, optical media, and so forth. The one or more memories 170 can be volatile in that information is retained while providing power or nonvolatile in that information is retained without providing power.

The one or more memories 170 store instructions for execution by the processor 162 in order to perform certain actions or functions. These instructions can include an operating system (OS) 172 configured to manage hardware resources, such as the I/O interfaces 164, and provide various services to applications executing on the processor 162. The one or more memories 170 can also store data files including information about the operating system 172.

The one or more client devices 110 communicate over one or more networks 130 with the cDVR system 160. The one or more client devices 110 include, but are not limited to, a set top-box (STB), smartphones, laptop computers, tablets, electronic book reading devices, processor-based devices, or the like. The one or more client devices 110 communicate with the cDVR system 160 over the one or more types of networks 130, such as a Wi-Fi network, a Wi-Fi Direct network, BLUETOOTH, a radio network, a cellular network (e.g., third generation, fourth generation (e.g., LTE), and/or fifth generation (5G)), a satellite network, a cable network, a landline-based network, the Internet, intranets, a telephone network, a television network, data networks, or other communication mediums connecting multiple computing devices to one another, as non-limiting examples.

The one or more client devices 110 each include one or more processors 112, one or more memories 120, data storage 118, one or more input/output (I/O) interfaces 114, and one or more communication interfaces 116. The one or more processors 112 can individually comprise one or more cores and can be configured to access and execute, at least in part, instructions stored in the one or more memories 120. The one or more memories 120 include one or more non-transitory computer readable storage media (CRSM). The one or more memories 120 can include, but are not limited to, random access memory (RAM), flash RAM, magnetic media, optical media, and so forth. The one or more memories 120 can be volatile in that information is retained while providing power or nonvolatile in that information is retained without providing power.

The one or more communication interfaces 116 provide for the transfer of data between the client device 110 and another device directly, via a network, or both. The communication interfaces 116 can include, but are not limited to, personal area networks (PANs), wired local area networks (LANs), wireless local area networks (WLANs), wireless wide area networks (WWANs), and so forth. The one or more communication interfaces 116 can utilize acoustic, radio frequency, optical, or other signals to exchange data between the one or more client devices 110 and another device such as an access point, a host computer, a router, an e-reader device, another one of the one or more client devices 110, and the like.

The one or more memories 120 store instructions for execution by the processor 112 in order to perform certain actions or functions. These instructions can include an operating system (OS) 122 configured to manage hardware resources, such as the I/O interfaces 114, and provide various services to applications executing on the processor 112. The one or more memories 120 can also store data files 124 including information about the operating system 122.

The one or more memories 120 store a cDVR client 126. The cDVR client 126 can receive or access information associated with the cDVR operating environment 100. The cDVR client 126 can communicate over the one or more networks 130 with the cDVR system 160. The memory 120 stores manifest data accessible to the cDVR client 126, where the manifest data is provided to enable the client device 110 to specify media segments when requesting a recorded media segment.

The one or more memories 120 store a live client 128. The live client 128 can receive information collected or generated by the cDVR client 126. The live client 128 can be in communication over one or more networks 130 with the cDVR system 160.

The one or more memories 170 store a cDVR client application 174. The cDVR client application 174 can receive requests from one or more client devices 110, schedule recordings, perform validation checks, perform quality control checks, and perform other cDVR functionality. The cDVR client application 174 communicates over the one or more networks 130 with the one or more client devices 110 or other devices in the cDVR operating environment 100.

The one or more memories 170 store an adaptive bit-rate (ABR) application 176. The ABR application 176 can receive information associated with the network connection quality and/or the client device 110 to determine an adaptive bit-rate associated with the client device 110. The ABR application 176 can determine an optimal set of bitrates associated with a particular device class associated with the client device 110 based at least in part on the information associated with the client device 110, the information associated with the network connection quality of the client device 110, the received request from the client device 110, and/or a user account profile associated with the client device 110.

The cDVR system 160 is in communication with the content experience platform (CEP) 180. The CEP 180 can provide guide data (e.g., linear video metadata management), include application interface servers (e.g., API servers or "app servers" for linear and on-demand services), and/or provide a content and service protection platform (e.g., a combination of privacy, network security, conditional access, and content protection of digital rights components). For example, the CEP 180 communicates to the cDVR system 160 that a unique-copy modality is required, and thus the cDVR system 160 stores, for a particular media object, a unique copy of distinct media segments on a per client device basis or on a per subscriber (e.g., per user account) basis.

The cDVR system 160 manages source data, which can describe where the source is located, and any information that can be requested by a user in association with the distinct media segment (e.g., rating information for the distinct media segment, duration of the distinct media segment, date the distinct media segment was recorded, and the like). For example, the cDVR system 160 stores the current segment duration for each of one or more sources. Other characteristics can also be stored in association with the distinct media segment. The cDVR system 160 can store information indicating whether to store a segment in a manner so that a user can receive a copy of the segment or if a segment can be shared by multiple users.

The cDVR client 126 generates and transmits a request to the cDVR client application 174 for a list of distinct media segment associated with the user account associated with the client device 110. The cDVR client application 174 can retrieve or otherwise obtain information other components within the cDVR system 160 and generate a list of all distinct media segment associated with the user account and metadata associated with the distinct media segment. For example, the metadata can include, but is not limited to, availability of the distinct media segment, quota information associated with the distinct media segment, or the like. The list of the distinct media segment associated with a user account, recording state, and quota information can be compiled and transmitted to the cDVR client 126 of a client device 110.

Figure 2:
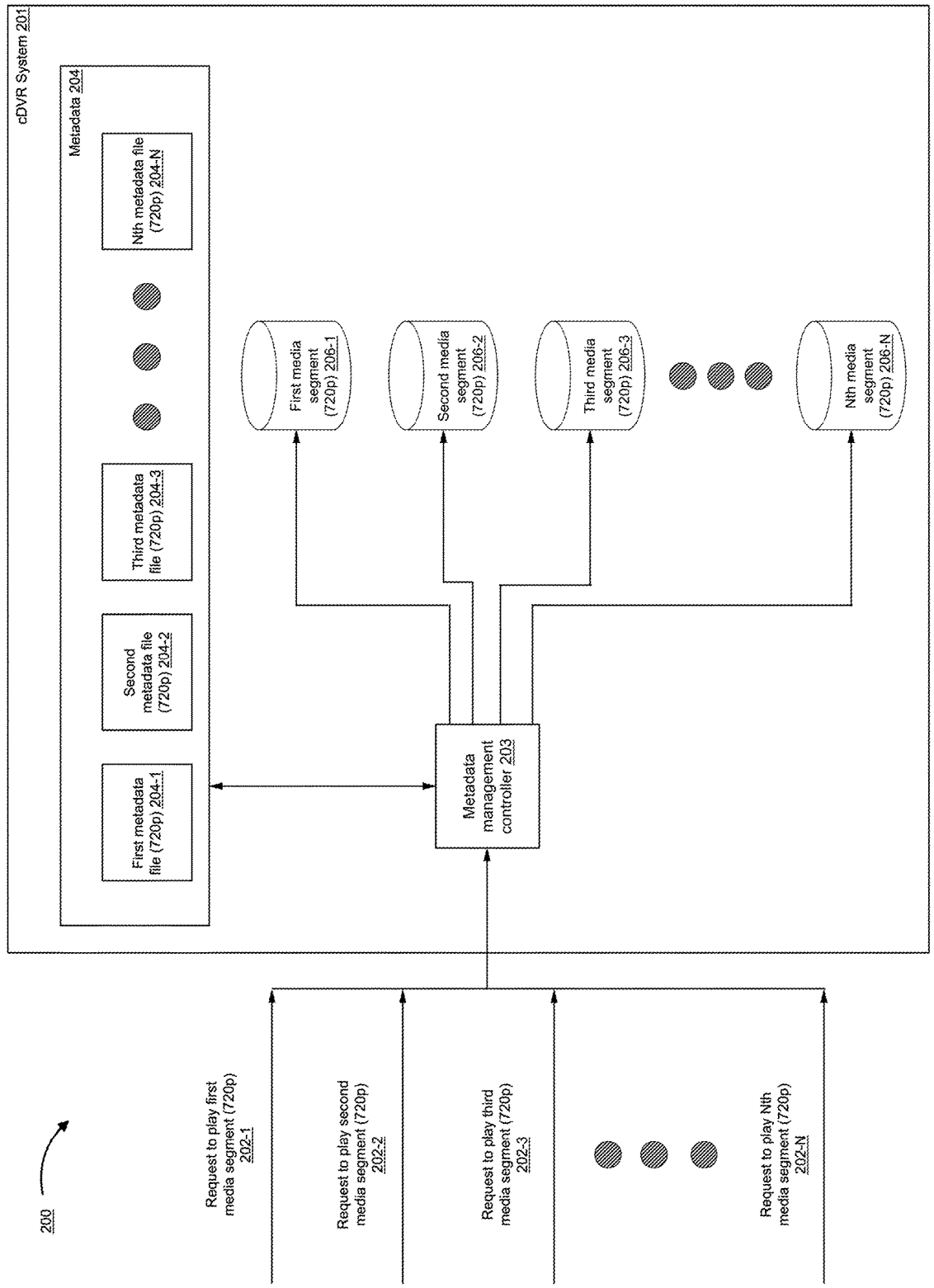
FIG. 2 is a data flow diagram associated with multiple playback requests in a cDVR operating environment.

FIG. 2 is a data flow diagram associated with multiple playback requests in a cDVR operating environment 200. Briefly, the cDVR operating environment 200 includes a cDVR system 201 that processes multiple playback requests on a corresponding per metadata file basis. Briefly, the cDVR system 201 includes a metadata management controller 203 that performs sequencing operations with respect to media segments in response to various playback requests. The metadata management controller 203 performs sequencing operations based on metadata 204 that is stored on the cDVR system 201.

Namely, the metadata management controller 203 receives a plurality of requests 202-1-202-N to playback a corresponding plurality of media segments 206-1-206-N stored on the cDVR system 201. For example, each of the plurality of media segments 206-1-206-N corresponds to a distinct representation of a media object, which itself may correspond to a complete recording of a television program. For example, the first media segment 206-1 represents the first two seconds of the media object, the second media segment 206-2 represents the second two seconds of the media object, etc. Additionally, as illustrated in FIG. 2, each of the plurality of media segments 206-1-206-N is associated with a 720p video resolution. One of ordinary skill in the art will appreciate that, in other circumstances, the video resolution of the segments is different.

In order to process the plurality of requests 202-1-202-N, the metadata management controller 203 obtains metadata 204 that is stored on the cDVR system 201. The metadata 204 including a plurality of metadata files 204-1-204-N respectively associated with the plurality of media segments 206-1-206-N. Specifically, the metadata 204 includes a first metadata file 204-1 that describes the first media segment 206-1, a second metadata file 204-2 that describes the second media segment 206-2, etc. Thus, in response to receiving a request 202-1 to playback a 720p representation of the first media segment, the metadata management controller 203 obtains and processes the first metadata file 204-1 in order to enable retrieval of the first media segment 206-1 stored on the cDVR system 201. Accordingly, for a particular media segment, the cDVR system 201 stores a corresponding metadata file, and the metadata management controller 203 processes the corresponding metadata file in response to receiving a request associated with the particular media segment. Moreover, in an ABR environment, the metadata 204 additionally includes a separate plurality of metadata files for each additional encoding rate. Thus, in a 1080p-4K dual encoding rate environment involving a recording request of 1000 media segments, the cDVR system 201 stores 1000 metadata files associated with the 1080p representation and another 1000 metadata files associated with the 4K representation.

EXAMPLE EMBODIMENTS

Reference will now be made to embodiments that provide improvements in storage and processing utilization with respect to a cDVR environment. Examples of the embodiments are illustrated in the accompanying drawings. In the following description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In contrast to managing media segments on a corresponding per metadata file basis as described with reference to FIG. 1 and FIG. 2, various embodiments disclosed herein include methods, cDVR systems, and apparatuses for generating and using a common metadata file. The common metadata file includes sequencing information associated with a plurality of sequential media segments, such as a combination of temporal information and sparse distinguishing metadata (e.g., identifying a first segment of a media object). Based on the sequencing information, a method includes storing the plurality of sequential media segments at, for example, a storage device that is separate from a recording agent or a playback agent. In some embodiments, the method includes recording the media object at different representations (e.g., different video resolutions, such as 720p, 1080p, 4K) by generating and utilizing a separate common metadata file for each representation. In some unique-copy circumstances (e.g., as required by law), the method includes utilizing the sequencing information included in the common metadata file, and utilizing limited additional information (e.g., recording identifier of an additional client) in order to store a unique copy of the plurality of sequential media segments. Accordingly, as compared with some cDVR systems that store and utilize a plurality of metadata files corresponding to a plurality of media segments, a smaller, common metadata file is stored and utilized. Thus, various embodiments disclosed herein utilize less storage and processing resources.

Figure 3:
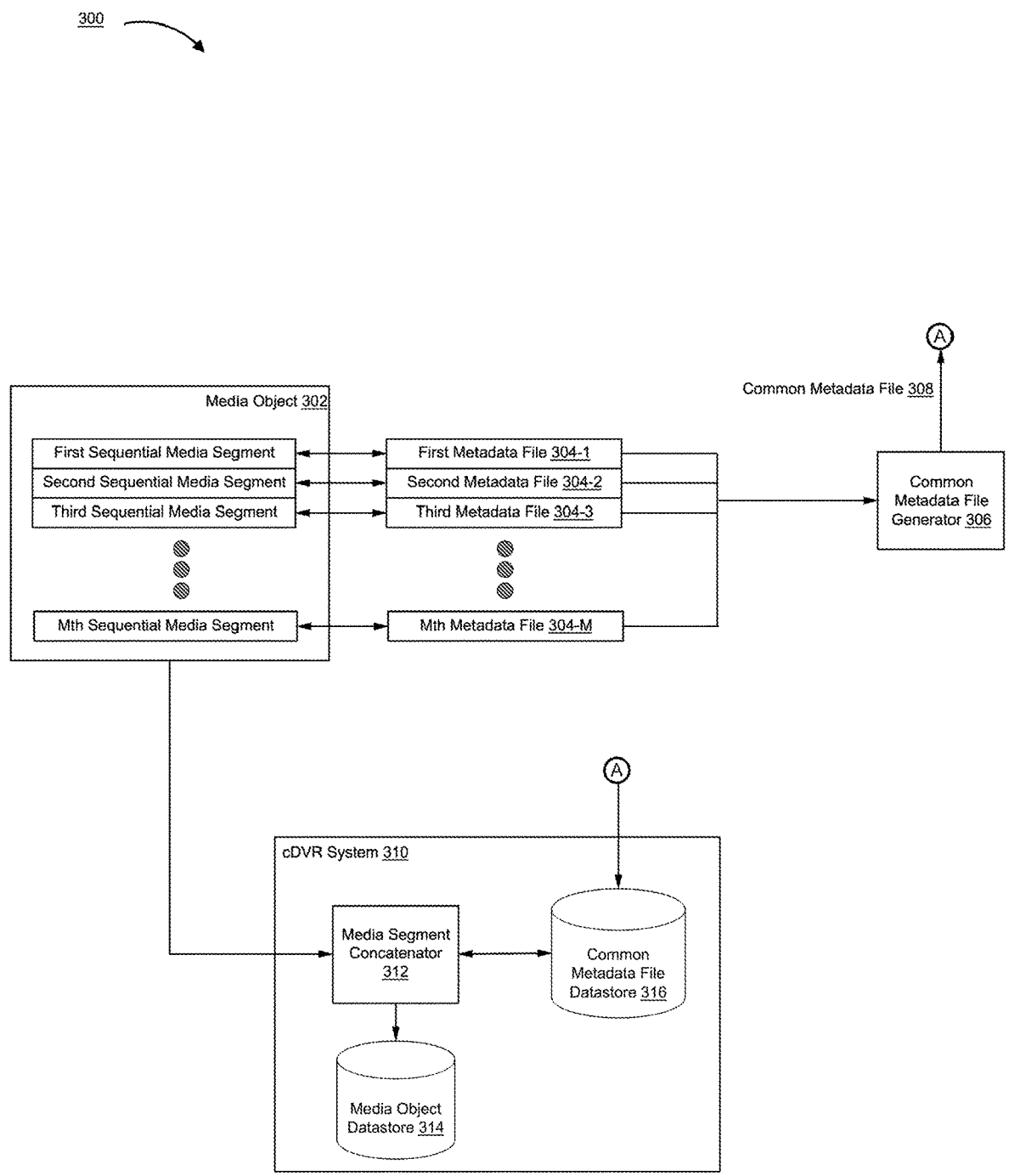
FIG. 3 is an example of a cDVR environment for storing a media object in accordance with some embodiments.

FIG. 3 is an example of a cDVR environment 300 for storing a media object 302 in accordance with some embodiments. Briefly, the cDVR environment 300 includes a cDVR system 310 for storing the media object 302 that includes a plurality of sequential media segments based on sequencing information included in a common metadata file 308.

The cDVR environment 300 includes a common metadata file generator 306. In some embodiments, as illustrated in FIG. 3, the common metadata file generator 306 is separate from (e.g., located on a different device than) the cDVR system 310. In some embodiments, the common metadata file generator 306 is integrated within the cDVR system 310.

The common metadata file generator 306 generates the common metadata file 308 from a plurality of metadata files 304-1-304-M. The common metadata file 308 includes sequencing information associated with the plurality of sequential media segments, which will be detailed below. The plurality of metadata files 304-1-304-M is respectively associated with a plurality of sequential media segments included in the media object 302. Each of the plurality of metadata files 304-1-304-M provides a description of a respective one of the plurality of sequential media segments. In some embodiments, the common metadata file generator 306 generates the common metadata file 308 by concatenating the plurality of metadata files 304-1-304-M. In some embodiments, the common metadata file generator 306 generates the common metadata file 308 by aggregating the plurality of metadata files 304-1-304-M together.

In some embodiments, the sequencing information includes temporal information associated with the media object 302. For example, the temporal information includes a temporal range (e.g., length of recording) and/or a start time value and stop time value. In some embodiments, the sequencing information includes a first segment identifier (e.g., a presentation time stamp (PTS)) associated with a first one of the plurality of sequential media segments. For example, the first one of the plurality of sequential media segments is the chronologically first segment of a television program (e.g., the opening credits). The temporal information can indicate the time span of the recording in a variety of ways. In some embodiments, the temporal information indicates one or more standard programming slots (e.g., 8:00 pm to 8:30 pm and 8:30 pm to 9:00 pm) and the cDVR system 310 determines the time span of the recording based on the programming slot.

In some embodiments, the common metadata file 308 includes a source identifier that identifies a source associated with the media object 302, such a particular television channel. For example, the source identifier indicates a broadcast channel or sub-channel (also referred to as profiles). In some embodiments, a broadcast channel can include sub-channels with multiple versions of the same broadcast. For example, the broadcast channel can include sub-channels (also referred to as channels) with video data at different bitrates or with different audio/subtitles. Thus, in some embodiments, the source identifier indicates a broadcast channel and a recording request further includes data indicating the sub-channel or profile. In some embodiments, the source identifier indicates the sub-channel or profile.

In some embodiments, the common metadata file 308 includes a recording identifier associated with the media object 302, such as a user profile identifier (e.g., a user's credential) or a subscriber identifier. In some embodiments, the recording identifier may be different for each recording request. For example, the recording identifier can be a UUID (universally unique identifier). In some embodiments, the request identifier includes a user ID or, at least, indicates a user identifier or user device (such as a set-top box).

In some embodiments, the common metadata file 308 includes an encoding rate identifier, such as "480p," "1080p," etc. for different video resolutions.

The cDVR system 310 obtains the plurality of sequential media segments (to be stored in a media object datastore 314), and obtains the common metadata file 308. In some embodiments, a common metadata file datastore 316 stores the common metadata file 308. The common metadata file 308 is smaller in size (e.g., requires less storage space) than the sum of respective sizes of the plurality of metadata files 304-1-304-M. Accordingly, as compared with the cDVR system 201 in FIG. 2, the cDVR system 310 utilizes less storage resources in storing metadata for processing (e.g., storing, playing back, and deleting) media segments of a media object.

The cDVR system 310 includes a media segment concatenator 312. The media segment concatenator 312 stores the plurality of sequential media segments in the media object datastore 314 based on the sequencing information included in the common metadata file 308. Because the media segment concatenator 312 processes the single, common metadata file 308, the media segment concatenator 312 utilizes less processing resources than the metadata management controller 203 in FIG. 2, which processes a plurality of metadata files 204-1-204-N.

In some embodiments, the media segment concatenator 312 generates a map that maps the sequencing information to an address range, and stores the plurality of sequential media segments at the address range. For example, in some embodiments, the map includes a plurality of logical byte offset values. As another example, in some embodiments, the address range corresponds to a contiguous address range.

Figure 4A:
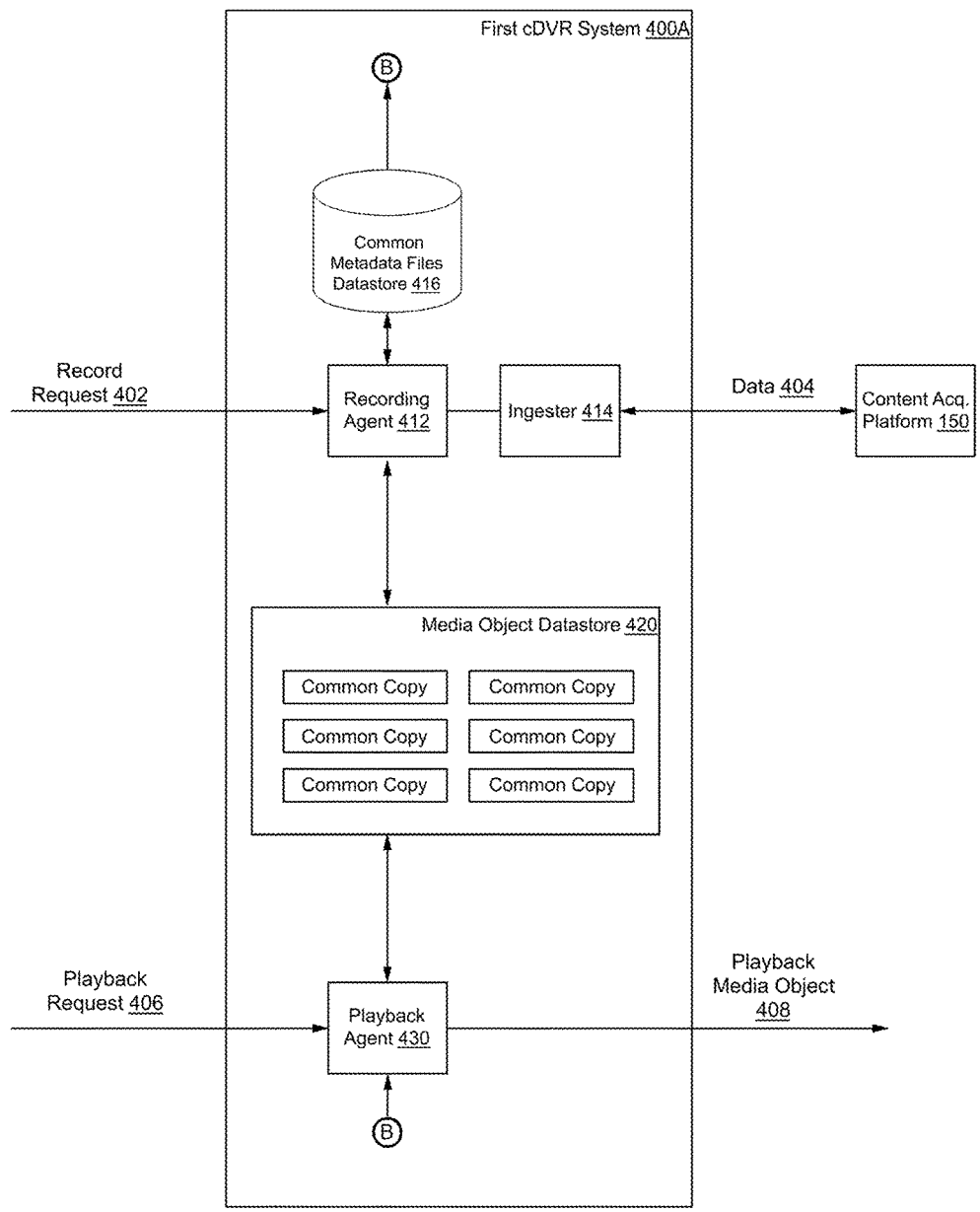
FIG. 4A is an example of a block diagram of a first cDVR system operating in a common copy mode in accordance with some embodiments.

FIG. 4A is an example of a block diagram of a first cDVR system 400A operating in a common copy mode in accordance with some embodiments. According to various embodiments, the first cDVR system 400A is similar to and adapted from the cDVR system 310 in FIG. 3. While certain specific features are illustrated, those of ordinary skill in the art will appreciate from the present disclosure that various other features have not been illustrated for the sake of brevity and so as not to obscure more pertinent aspects of the example embodiments disclosed herein.

With respect to recording operations, the first cDVR system 400A includes an ingester 414 that receives data 404 (e.g., from the content acquisition platform 150), a recording agent 412 that receives one or more record request(s) 402 to store the data 404, and a media object datastore 420 that stores the data 404. The media object datastore 420 includes a number of storage locations at which media objects can be stored. The media object datastore 420 stores, among other things, common copies of different media objects (e.g., different episodes of a television show or different television shows). For example, a particular common copy of a media object corresponds to a sports program requested to be recorded by multiple subscribers. Accordingly, during playback, the first cDVR system 400A may retrieve the particular common copy multiple times for the multiple subscribers.

In some embodiments, the recording agent 412 includes a common metadata file generator (e.g., the common metadata file generator 306 in FIG. 3) that generates and stores a plurality of common metadata files into a common metadata files datastore 416. Each of the plurality of common metadata files is associated with a corresponding media object. Accordingly, each of the plurality of common metadata files includes sequencing information associated with a respective plurality of sequential media segments included in the corresponding media object.

Moreover, in some embodiments, the recording agent 412 includes a media segment concatenator (e.g., the media segment concatenator 312 in FIG. 3) that processes incoming sequential media segments based a corresponding one of the plurality of common metadata files. For example, in response to receiving a request 402 to record a first media object including a first plurality of sequential media segments, the recording agent 412 generates a corresponding common metadata file and stores the common metadata file into the common metadata files datastore 416. Continuing with this example, the recording agent 412 stores the first plurality of sequential media segments based on sequencing information included in the corresponding metadata file.

With respect to playback operations, the first cDVR system 400A includes a playback agent 430 that receives one or more playback request(s) 406 to playback (e.g., retrieve) one or more media objects from the media object datastore 420. In response to receiving the one or more playback request(s) 406, the playback agent 430 retrieves a corresponding common copy from the media object datastore 420 and outputs the corresponding common copy of the media object 408.

In some embodiments, the playback agent 430 includes a media segment concatenator (e.g., the media segment concatenator 312 in FIG. 3) that obtains, from the common metadata files datastore 416, the plurality of common metadata files and utilizes a portion thereof. For example, in response to receiving a request 406 to playback a first media object including a first plurality of sequential media segments, the playback agent 430 identifies a corresponding one of the plurality of common metadata files. Continuing with this example, the playback agent 430 retrieves the first plurality of sequential media segments based on sequencing information included in the corresponding one of the plurality of common metadata files.

Figure 4B:
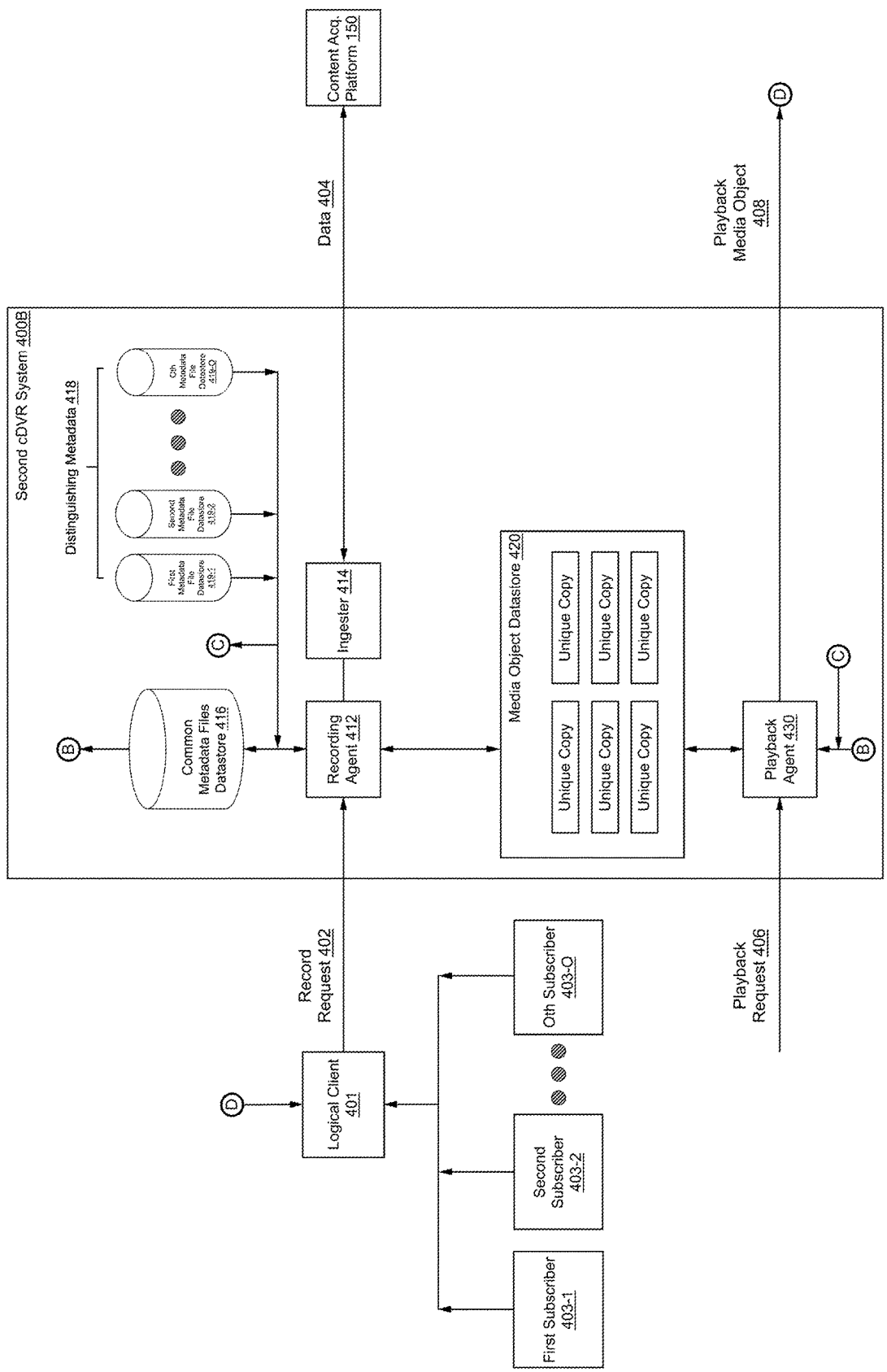
FIG. 4B is an example of a block diagram of a second cDVR system operating in a unique copy mode in accordance with some embodiments.

FIG. 4B is an example of a block diagram of a second cDVR system 400B operating in a unique copy mode in accordance with some embodiments. While certain specific features are illustrated, those of ordinary skill in the art will appreciate from the present disclosure that various other features have not been illustrated for the sake of brevity and so as not to obscure more pertinent aspects of the example embodiments disclosed herein. For example, the second cDVR system 400B includes some of the components included within the first cDVR system 400A, and thus discussion of the components are omitted for the sake of brevity.

In contrast to the first cDVR system 400A, the second cDVR system 400B operates in a unique copy mode, such as according to requirements imposed by copyright law. Accordingly, as illustrated in FIG. 4B, the second cDVR system 400B stores, within the media object datastore 420, a plurality of unique copies of a media object. For example, the second cDVR system 400B receives, from a logical client 401, a recording request 402 that includes a plurality of recording identifiers that respectively identify a plurality of subscribers 403-1-403-O. In some embodiments, the logical client 401 corresponds to a head-end device. In some embodiments, the plurality of subscribers 403-1-403-O is associated with a plurality of user profiles.

The second cDVR system 400B manages (e.g., records, plays back, and deletes) media segments based on sequencing information within the common metadata file 416, as described with respect to FIG. 4A, and based on distinguishing metadata 418. The distinguishing metadata 418 distinguishes the plurality of subscribers 403-1-403-O (e.g., plurality of user profiles) from each other. For example, in some embodiments, the distinguishing metadata 418 includes a plurality of metadata files (e.g., stored in a corresponding plurality of metadata file datastores 419-1-419-O) that respectively identify the plurality of subscribers 403-1-403-O. For example, each of the plurality of metadata files 419-1-419-O includes a respective recording identifier. Thus, continuing with this example, each of the recording agent 412 and the playback agent 430 compares the plurality of recording identifiers within the distinguishing metadata against recording identifiers included in the recording request 402 in order to facilitate recording and playback operations, respectively. Accordingly, in some embodiments, the second cDVR system 400B utilizes a combination of the common metadata file 416 and the plurality of metadata files 419-1-419-O. Nevertheless, the second cDVR system 400B utilizes less storage and processing resources than the cDVR system 201 illustrated in FIG. 2 because the cDVR system 201 utilizes A×B number of total metadata files, where A is the number of media segments in a media object and B is the number of subscribers identified in a corresponding request.

Figure 5:
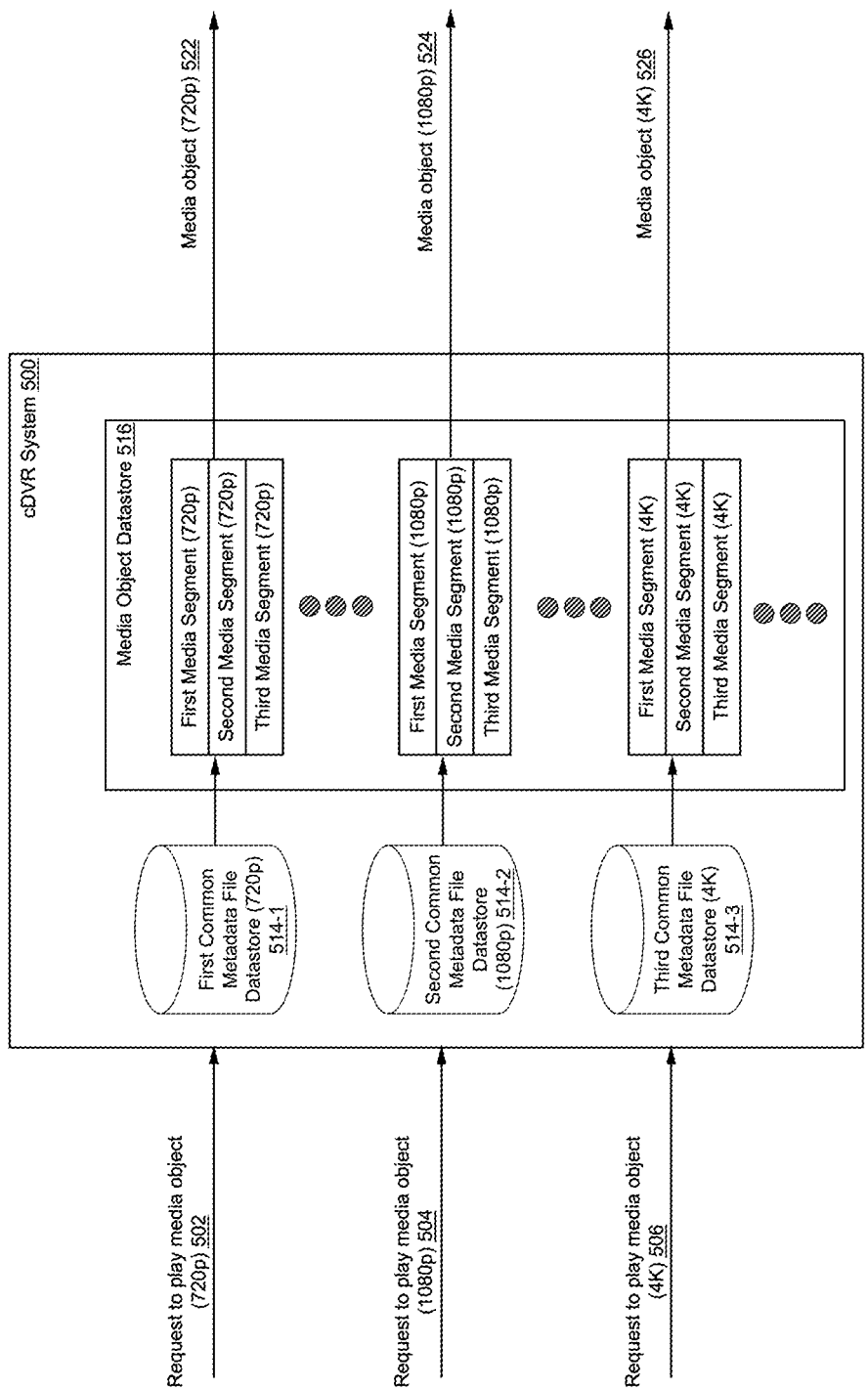
FIG. 5 is an example of a block diagram of a cDVR system satisfying playback requests requesting different representations of a media object in accordance with some embodiments.

FIG. 5 is an example of a block diagram of a cDVR system 500 satisfying playback requests requesting different representations of a media object in accordance with some embodiments. For example, in some embodiments, the cDVR system 500 operates in an ABR mode. According to various embodiments, the cDVR system 500 is similar to and adapted from the cDVR system 310 in FIG. 3. According to various embodiments, the cDVR system 500 is similar to and adapted from the first cDVR system 400A in FIG. 4A. According to various embodiments, the cDVR system 500 is similar to and adapted from the second cDVR system 400B in FIG. 4B. While certain specific features are illustrated, those of ordinary skill in the art will appreciate from the present disclosure that various other features have not been illustrated for the sake of brevity and so as not to obscure more pertinent aspects of the example embodiments disclosed herein.

According to various embodiments, the cDVR system 500 utilizes a plurality of common metadata files respectively associated with a plurality of representations of a media object. In some embodiments, each of the plurality of representations is associated with a different encoding rate, resolution, audio quality, or a combination thereof. For example, as illustrated in FIG. 5, the cDVR system 500 includes a first common metadata file datastore 514-1 that stores a first common metadata file associated with a 720p video resolution of the media object. The cDVR system 500 includes a second common metadata file datastore 514-2 that stores a second common metadata file associated with a 1080p video resolution of the media object. The cDVR system 500 includes a third common metadata file datastore 514-3 that stores a third common metadata file associated with a 4K video resolution of the media object. One of ordinary skill in the art will appreciate, in some embodiments, the cDVR system 500 stores and utilizes more or fewer common metadata files, such as associated with different video resolutions, audio rates, etc.

The cDVR system 500 receives a playback request 502 requesting playback of the media at the 720p resolution. In response to receiving the playback request 502, the cDVR system 500 identifies the first common first common metadata file that is associated with the 720p resolution and obtains the first common first common metadata file from the first common metadata file datastore 514-1. The first common first common metadata file includes sequencing instructions that enable the cDVR system 500 to retrieve 720p media segments from a media object datastore 516. The cDVR system 500 provides the 720p media object 522 to the requesting entity for playback. In some embodiments, the cDVR system 500 generates a map that maps the sequencing information to byte values associated with the media object datastore 516.

The cDVR system 500 also receives a playback request 504 requesting playback of the media at the 1080p resolution and a playback request 506 requesting playback of the media at the 4K resolution. Accordingly, the cDVR system 500 obtains the second common metadata file 514-2 and the third common metadata file 514-3, respectively, and provides a corresponding 1080p media object 524 and a 4K media object 526 similar to as discussed above with respect to satisfying the playback request 502 for the 720p media object.

Accordingly, the cDVR system 500 utilizes (e.g., stores and processes) a single common metadata file per representation of a media object. Other cDVR systems, on the other hand, utilize a B×C number of total metadata files for satisfying requests for different representations of media objects, wherein B is the number of metadata files associated with a number of media segments within a media object and C is the number of different representations. Thus, as compared with other cDVR systems, the cDVR system 500 utilizes less storage and processing resources.

Figure 6:
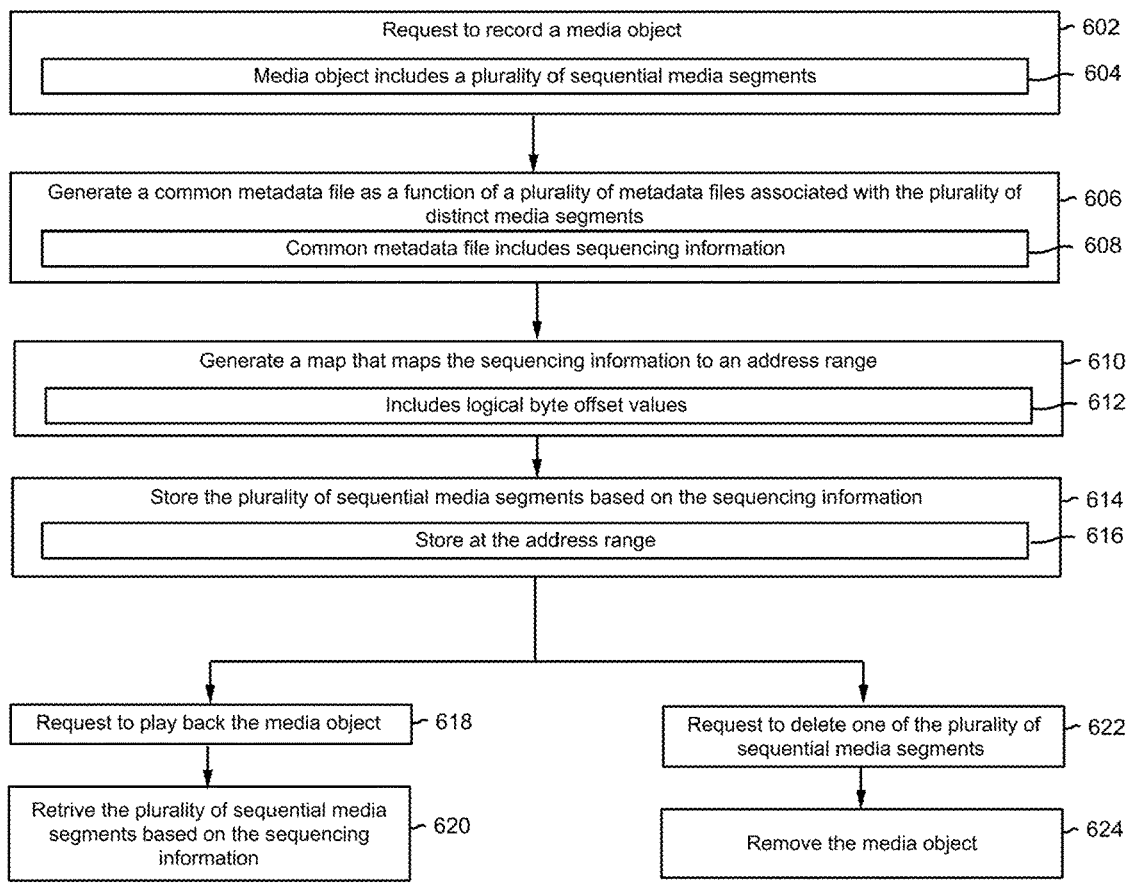
FIG. 6 is an example of a flow diagram of a method of managing media segments using a common metadata file in accordance with some embodiments.

FIG. 6 is an example of a flow diagram of a method 600 of managing media segments using a common metadata file in accordance with some embodiments. In some embodiments, the method 600 or portions thereof is performed at the cDVR system 310 in FIG. 3, the first cDVR system 400A in FIG. 4A, the second cDVR system 400B in FIG. 4B, or the cDVR system 500 in FIG. 5. In some embodiments, the method 600 or portions thereof are performed by an electronic device or an apparatus.

As represented by block 602, the method 600 includes receiving a request to initiate recording of a media object, such as the record request 402 in FIG. 4A and FIG. 4B. As represented by block 604, the media object includes a first plurality of sequential media segments. The first plurality of sequential media segments is associated with a corresponding plurality of metadata files, and each of the corresponding plurality of metadata files provides a description of a respective one of the first plurality of sequential media segments. In some embodiments, a portion of the corresponding plurality of metadata files are respectively associated with a plurality of metadata records. For example, the media object is a complete (e.g., entire) recording. In some embodiments, a recording agent, which is separate from a storage device, receives the request. In some embodiments, the request is idempotent, such as a HTTP PUT request. In some embodiments, the request is not idempotent, such as a HTTP POST request, in which case successive requests may change the result caused by the initial request.

As represented by block 606, the method 600 includes generating, in response to receiving the request to initiate recording of the media object, a first common metadata file that is associated with the media object as a function of the corresponding plurality of metadata files. For example, with reference to FIG. 3, the common metadata file generator 306 generates the common metadata file 308. The first common metadata file is smaller than the sum of the corresponding plurality of metadata files.

As represented by block 608, the first common metadata file includes sequencing information associated with the first plurality of sequential media segments. In some embodiments, the sequencing information includes object size information that indicates the total size of the first plurality of sequential media segments. In some embodiments, the sequencing information includes segment number information indicative of the number of the first plurality of sequential media segments.

As represented by block 610, in some embodiments, the method 600 includes generating a map that maps the sequencing information to an address range. In some embodiments, the map is maintained at a storage device separate from a recording agent or from a playback agent. For example, the address range corresponds to bytes on a disc. As represented by block 612, in some embodiments, the map includes a plurality of logical byte offset values. In some embodiments, the address range is a contiguous address range.

As represented by block 614, the method 600 includes storing the first plurality of sequential media segments based on the sequencing information included in the first common metadata file. In some embodiments, a storage device stores the first plurality of sequential media segments. For example, with reference to FIG. 3, the media segment concatenator 312 stores, within the media object datastore 314, a first plurality of sequential media segments based on the sequencing information stored at the common metadata file datastore 316. As another example, with reference to FIGS. 4A and 4B, the method 600 includes storing, within the media object datastore 420, the first plurality of sequential media segments based on the sequencing information stored at the common metadata file datastore 416. Accordingly, in some embodiments, the method 600 provides on-the-fly flattening of media segments that are described by the first common metadata file. For example, in some embodiments, the one-the-fly flattening of the media segments includes concatenating the media segments based on the sequencing information. As represented by block 616, in some embodiments, storing the first plurality of sequential media segments includes storing the first plurality of sequential media segments at the address range.

As represented by block 618, in some embodiments, the method 600 includes receiving a request to initiate playback of the media object. For example, with reference to FIG. 5, the cDVR system 500 receives different playback requests 502-506 associated with different representations of the media object. In some embodiments, the playback request is associated with a single representation, such as a single user profile. In some embodiments, the playback request is received at a playback agent, which may be separate from the storage device. In some embodiments, the playback request is a GET request. In some embodiments, the playback request is received from a logical client (e.g., the logical client 401 in FIG. 4B) that communicates with a plurality of subscribers (e.g., the plurality of subscribers 403-1-403-O in FIG. 4B). In some embodiments, the playback request is received directly from a particular subscriber. As represented by block 620, in some embodiments, the method 600 includes, in response to receiving the request to initiate playback of the media object, retrieving the first plurality of sequential media segments at the address range indicated by the map, and providing the first plurality of sequential media segments for playback. For example, with reference to FIG. 4B, the second cDVR system 400B provides a playback media object 408 to the logical client 401.

In some implementations, the method 600 includes flattening media segments in order to enable more efficient playback of sequential media segments. For example, the method 600 includes flattening 32, 4K sequential media segments by sequentially storing the 32 sequential media segments in a 128 k memory block. Thus, the first 4K of the 128 k memory block includes the first 4K sequential media segment, the second 4K of the 128 k memory block includes the second 4K sequential media segment, etc. In some implementations, in response to receiving a request to playback the first 4K sequential media segment, the method 600 includes performing an I/O operation with respect to the 128 k memory block, and retrieving the first 4K sequential media segment for playback based on the I/O operation. For example, performing the I/O operation includes copying the contents of the 128K memory block into a RAM, and retrieving the first 4K sequential media segment includes reading out the first 4K sequential media segment from the RAM. In response to playback requests of subsequent sequential media segments, such as the second 4K sequential media segment, the third 4K sequential media segment, etc., the method 600 includes reading out the respective sequential media segments from the RAM, without having to perform additional I/O operations. For example, the method 600 includes using one or more offset byte values in order to read sequential media segments from the RAM. Thus, the methods 600 enables a more efficient playback operation than other cDVR systems, in which a separate I/O operation is performed for each playback request of a media segment.

As represented by block 622, in some embodiments, the method 600 includes receiving a request to delete a particular one of the plurality of sequential media segments. As represented by block 624, in some embodiments, the method 600 includes determining, based on contents of the request to delete, that the particular one of the plurality of sequential media segments is associated with the media object. Moreover, in response to determining that the particular one of the plurality of sequential media segments is associated with the media object, the method 600 includes removing the plurality of sequential media segments included in the media object. In some embodiments, the contents of the request to delete include source information associated with the media object, start time information associated with the media object, and stop time information associated with the media object. Thus, in contrast to other cDVR systems in which multiple delete requests are utilized in order to trigger deletion operations of corresponding multiple media segments, the method 600 enables processing of a single delete request in order to remove a plurality of media segments. Accordingly, the method 600 utilizes less storage and processing resources, enabling a more efficient lifecycle for a corresponding cDVR system. In contrast to features described with reference to the method 600, other cDVR systems receive numerous delete requests corresponding to the number of media segments to be deleted, such as 1,800 separate delete requests for a media object including 1,800 media segments. Thus, the features of the method 600 utilize less processing and storage in performing a deletion of a media object resources than the other cDVR systems.

Figure 7:
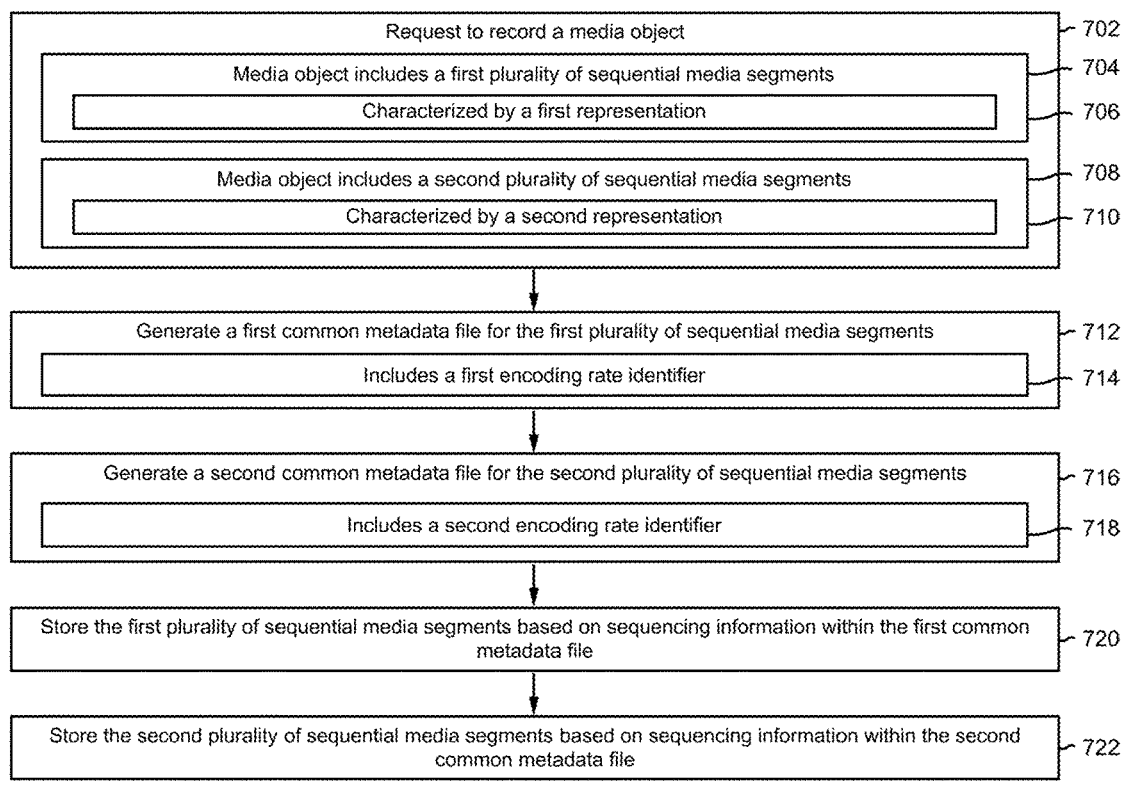
FIG. 7 is an example of a flow diagram of a method of storing different representations of media segments using different common metadata files in accordance with some embodiments.

FIG. 7 is an example of a flow diagram of a method 700 of storing different representations of media segments using different common metadata files in accordance with some embodiments. In some embodiments, the method 700 or portions thereof is performed at the cDVR system 310 in FIG. 3, the first cDVR system 400A in FIG. 4A, the second cDVR system 400B in FIG. 4B, or the cDVR system 500 in FIG. 5. In some embodiments, the method 700 or portions thereof is performed by an electronic device or an apparatus.

As represented by block 702, the method 700 includes receiving a request to initiate recording of a media object. As represented by block 704, the media object includes a first plurality of sequential media segments. As represented by block 706, the first plurality of sequential media segments is characterized by a first representation, such as a video resolution, audio resolution, a combination thereof, etc. For example, with reference to FIG. 5, the first plurality of sequential media segments corresponds to the plurality of media segments associated with a 720p video resolution, stored within the media object datastore 516.

As represented by block 708, the media object also includes a second plurality of sequential media segments. As represented by block 710, the second plurality of sequential media segments is characterized by a second representation that is different from the first representation. The second plurality of sequential media segments is associated with a second corresponding plurality of metadata files. Each of the second corresponding plurality of metadata files provides a description of a respective one of the second plurality of sequential media segments. For example, with reference to FIG. 5, the second plurality of sequential media segments corresponds to the plurality of media segments associated with a 1080p video resolution, stored within the media object datastore 516. In some embodiments, the first and second representations are utilized according to ABR implementations.

As represented by block 712, in some embodiments, the method 700 includes generating, in response to receiving the request to initiate recording of the media object, a first common metadata file that is associated with the media object. The method 700 includes generating the first common metadata file as a function of the corresponding plurality of metadata files associated with the first plurality of sequential media segments. The first common metadata file includes sequencing information associated with the first plurality of sequential media segments. As represented by block 714, in some embodiments, the first common metadata file includes a first encoding rate identifier that provides information associated with the first representation.

As represented by block 716, in some embodiments, the method 700 includes generating, in response to receiving the request to initiate recording of the media object, a second common metadata file that is associated with the media object. The method 700 includes generating the second common metadata file as a function of a corresponding plurality of metadata files associated with the second plurality of sequential media segments. The second common metadata file includes sequencing information associated with the second plurality of sequential media segments. As represented by block 718, in some embodiments, the second common metadata file includes a second encoding rate identifier that provides information associated with the second representation.

As represented by block 720, in some embodiments, the method 700 includes storing the first plurality of sequential media segments based on the sequencing information included in the first common metadata file. As represented by block 722, in some embodiments, the method 700 includes storing the second plurality of sequential media segments based on the sequencing information included in the second common metadata file.

Figure 8:
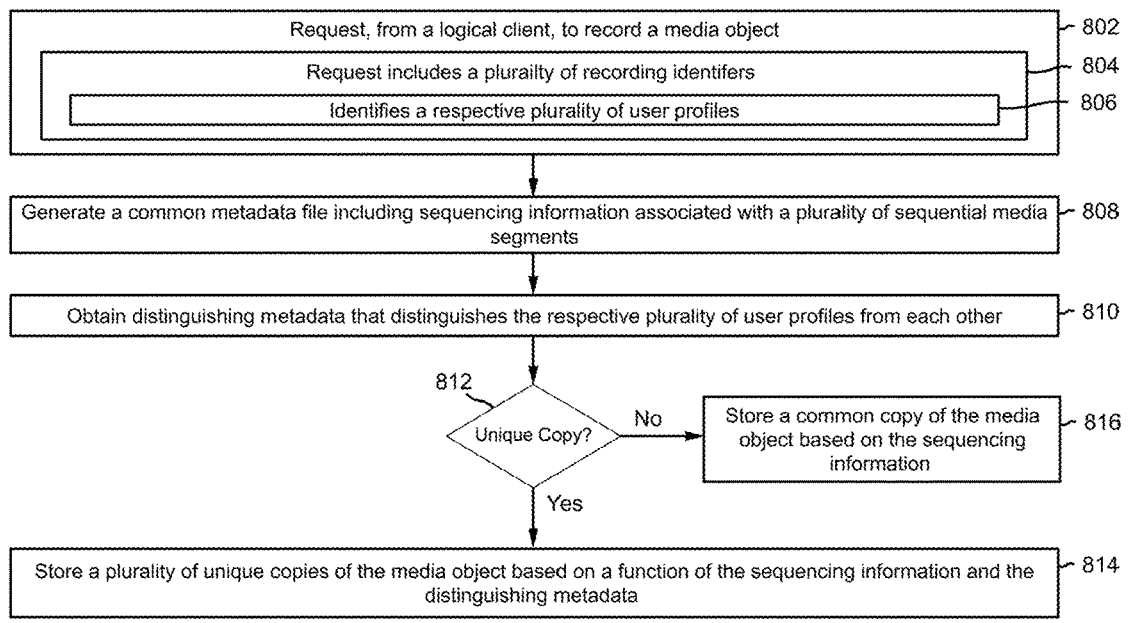
FIG. 8 is an example of a flow diagram of a method of performing unique copy operations and common copy operations with respect to media segments in accordance with some embodiments.

FIG. 8 is an example of a flow diagram of a method 800 of performing unique copy operations and common copy operations with respect to media segments in accordance with some embodiments. In some embodiments, the method 800 or portions thereof is performed at the cDVR system 310 in FIG. 3, the first cDVR system 400A in FIG. 4A, the second cDVR system 400B in FIG. 4B, or the cDVR system 500 in FIG. 5. In some embodiments, the method 800 or portions thereof is performed by an electronic device or an apparatus.

As represented by block 802, in some embodiments, the method 800 includes receiving, from a logical client, a request to initiate recording of a media object. The media object includes a first plurality of sequential media segments. The first plurality of sequential media segments is associated with a corresponding plurality of metadata files, and each of the corresponding plurality of metadata files provides a description of a respective one of the first plurality of sequential media segments. For example, with reference to FIG. 4B, the second cDVR system 400B receives, from the logical client 401, a record request 402. As another example, the logical client corresponds to a head-end device that services a plurality of subscribers.

As represented by block 804, in some embodiments, the request includes a plurality of recording identifiers. As represented by block 806, in some embodiments, the plurality of recording identifiers identifies a respective plurality of user profiles. For example, with reference to FIG. 4B, the record request 402 includes a plurality of recording identifiers that respectively identify the plurality of subscribers 403-1-403-O. As another example, the plurality of recording identifiers respectively identifies a plurality of subscribers. In some embodiments, the method 800 includes receiving a separate recording request for each recording identifier (e.g., each user profile) that is interested in a media segment.

As represented by block 808, the method 800 includes generating a common metadata file that is associated with the media object as a function of the corresponding plurality of metadata files. The common metadata file includes sequencing information associated with the first plurality of sequential media segments.

As represented by block 810, in some embodiments, the method 800 includes obtaining distinguishing metadata that distinguishes the respective plurality of user profiles from each other. For example, with reference to FIG. 4B, the distinguishing metadata 418 includes a plurality of metadata files (e.g., stored at a corresponding plurality of metadata file datastores 419-1-419-O).

As represented by block 812, in some embodiments, the method 800 includes determining whether or not a unique copy mode of operation is appropriate, such as may be imposed by copyright law. In accordance with a determination that the unique copy mode of operation is appropriate, the method 800 proceeds to a portion of the method 800 represented by block 814. On the other hand, in accordance with a determination that the unique copy mode of operation is not appropriate, the method 800 proceeds to a portion of the method 800 represented by block 816.

As represented by block 814, in some embodiments, the method 800 includes storing a plurality of unique copies of the first plurality of sequential media segments based on a function of the sequencing information and the distinguishing metadata. For example, with reference to FIG. 4B, the second cDVR system 400B stores a plurality of unique copies within the media object datastore 420 based on a function of the distinguishing metadata 418 and the common metadata file stored in the common metadata file datastore 416.

As represented by block 816, in some embodiments, the method 800 includes storing a common copy of the first plurality of sequential media segments based on a function of the sequencing information. For example, with reference to FIG. 4A, the first cDVR system 400A stores a single common copy within the media object datastore 420 based on a function of the common metadata file stored in the common metadata file datastore 416.

In some embodiments, the method 800 includes storing the first common metadata file in association with the distinguishing metadata.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
receiving a plurality of requests to initiate recording of a media object, wherein the media object includes a first plurality of sequential media segments, wherein the first plurality of sequential media segments is associated with a corresponding plurality of metadata files, and wherein each of the corresponding plurality of metadata files provides a description of a respective one of the first plurality of sequential media segments;
generating, in response to receiving the plurality of requests to initiate recording of the media object, a first common metadata file for the plurality of requests that is associated with the media object as a function of the corresponding plurality of metadata files including concatenating the first plurality of sequential media segments and recording in the first common metadata file sequencing information associated with the first plurality of sequential media segments and a plurality of recording identifiers associated with the plurality of requests; and
storing the first common metadata file for the recording of the media object and storing the concatenated first plurality of sequential media segments based on the sequencing information included in the first common metadata file.

2. The method of claim 1, further comprising generating a map that maps the sequencing information to an address range, wherein storing the first plurality of sequential media segments includes storing the first plurality of sequential media segments at the address range.

3. The method of claim 2, wherein the map includes a plurality of logical byte offset values.

4. The method of claim 2, wherein the address range corresponds to a contiguous address range.

5. The method of claim 2, further comprising:
receiving a request to initiate playback of the media object;
retrieving the first plurality of sequential media segments at the address range in response to receiving the request to initiate playback of the media object; and
providing the first plurality of sequential media segments for playback.

6. The method of claim 1, wherein the sequencing information indicates a concatenation of the first plurality of sequential media segments.

7. The method of claim 1, wherein the sequencing information includes temporal information associated with the media object.

8. The method of claim 1, wherein the sequencing information includes a first segment identifier associated with a first one of the first plurality of sequential media segments.

9. The method of claim 1, wherein the first common metadata file includes a source identifier that identifies a source associated with the media object.

10. The method of claim 9, wherein the source identifier identifies a television channel.

11. The method of claim 1, wherein the first common metadata file includes a recording identifier associated with the media object.

12. The method of claim 1, wherein the first common metadata file includes an encoding rate identifier.

13. The method of claim 1, wherein the first plurality of sequential media segments is characterized by a first representation, and wherein the media object also includes a second plurality of sequential media segments characterized by a second representation that is different from the first representation, wherein the second plurality of sequential media segments is associated with a second corresponding plurality of metadata files, and wherein each of the second corresponding plurality of metadata files provides a description of a respective one of the second plurality of sequential media segments, the method further comprising:
  generating, in response to receiving the plurality of requests to initiate recording of the media object, a second common metadata file for the plurality of requests that is associated with the media object as a function of the second corresponding plurality of metadata files including concatenating the second plurality of sequential media segments and recording in the second common metadata file sequencing information associated with the second plurality of sequential media segments and the plurality of recording identifiers associated with the plurality of requests; and
  storing the second common metadata file for the recording of the media object and storing the concatenated second plurality of sequential media segments based on the sequencing information included in the second common metadata file.

14. The method of claim 13, wherein the first and second representations are utilized according to an adaptive bitrate (ABR) implementation.

15. The method of claim 1, wherein the plurality of requests is received from a first logical client, wherein the plurality of recording identifiers identifying a respective plurality of user profiles, the method further comprising:
  storing a plurality of unique copies of the first plurality of sequential media segments based on a function of the sequencing information and distinguishing metadata that distinguishes the respective plurality of user profiles from each other.

16. The method of claim 15, further comprising storing the first common metadata file in association with the distinguishing metadata.

17. The method of claim 1, further comprising:
  receiving a request to delete a particular one of the plurality of sequential media segments;
  determining, based on contents of the request to delete, that the particular one of the plurality of sequential media segments is associated with the media object; and
  removing, in response to determining that the particular one of the plurality of sequential media segments is associated with the media object, the plurality of sequential media segments included in the media object.

18. The method of claim 17, wherein the contents of the request to delete include source information associated with the media object, start time information associated with the media object, and stop time information associated with the media object.

19. A cloud digital video recorder (cDVR) system comprising:
  one or more processors; and
  a non-transitory computer-readable medium including instructions, which, when executed, cause the one or more processors to perform operations including:
    receiving a plurality of requests to initiate recording of a media object, wherein the media object includes a first plurality of sequential media segments, wherein the first plurality of sequential media segments is associated with a corresponding plurality of metadata files, and wherein each of the corresponding plurality of metadata files provides a description of a respective one of the first plurality of sequential media segments;
    generating, in response to receiving the plurality of requests to initiate recording of the media object, a first common metadata file for the plurality of requests that is associated with the media object as a function of the corresponding plurality of metadata files including concatenating the first plurality of sequential media segments and recording in the first common metadata file sequencing information associated with the first plurality of sequential media segments and a plurality of recording identifiers associated with the plurality of requests; and
    storing the first common metadata file for the recording of the media object and storing the concatenated first plurality of sequential media segments based on the sequencing information included in the first common metadata file.

20. A non-transitory computer-readable medium including instructions, which, when executed by an electronic device including one or more processors, cause the electronic device to:
  receive a plurality of requests to initiate recording of a media object, wherein the media object includes a first plurality of sequential media segments, wherein the first plurality of sequential media segments is associated with a corresponding plurality of metadata files, and wherein each of the corresponding plurality of metadata files provides a description of a respective one of the first plurality of sequential media segments;
  generate, in response to receiving the plurality of requests to initiate recording of the media object, a first common metadata file for the plurality of requests that is associated with the media object as a function of the corresponding plurality of metadata files including concatenating the first plurality of sequential media segments and recording in the first common metadata file sequencing information associated with the first plurality of sequential media segments and a plurality of recording identifiers associated with the plurality of requests; and
  store the first common metadata file for the recording of the media object and storing the concatenated first plurality of sequential media segments based on the sequencing information included in the first common metadata file.

* * * * *